A. POST.

Hay-Rack.

No. {1,580, 32,584.}

Patented June 18, 1861.

Witnesses:

Inventor:
Abel Post
By his attorney
J. Fraser

UNITED STATES PATENT OFFICE.

ABEL POST, OF HENRIETTA, NEW YORK.

IMPROVED MODE OF VENTILATING HAY, GRAIN, &c.

Specification forming part of Letters Patent No. 32,584, dated June 18, 1861.

*To all whom it may concern:*

Be it known that I, ABEL POST, of Henrietta, in the county of Monroe and State of New York, have invented a new and Improved Method of Ventilating and Preserving Hay and Grain in the Stack or Mow; and I do hereby declare that the following is a full and exact description thereof, reference being had to the accompanying drawings, making part of this specification, in which—

Figure 1:
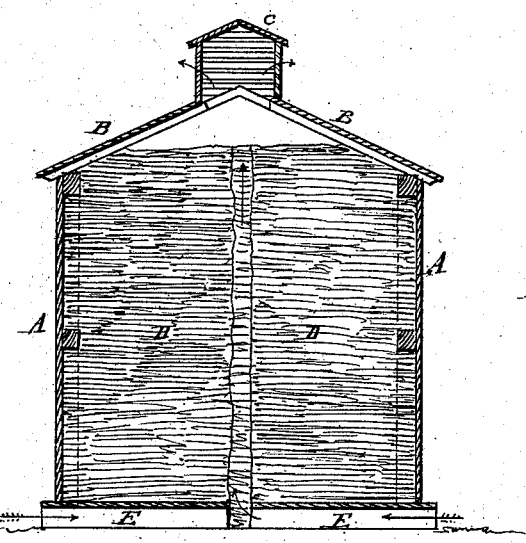
Figure 5:
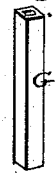
Figure 3:
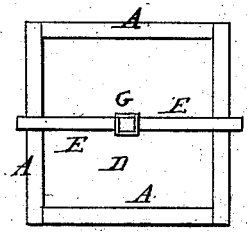
Figure 2:
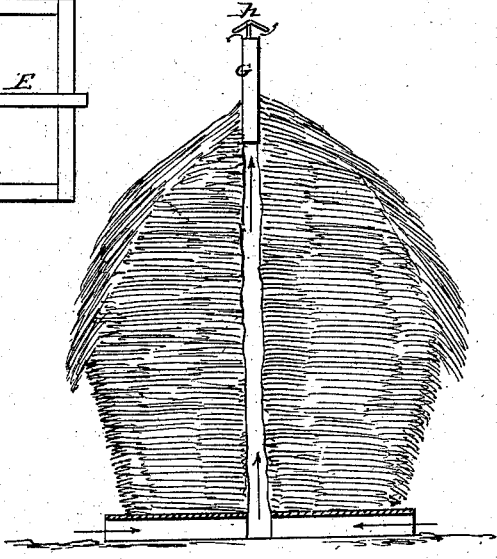
Figure 4:

Figure 1 represents a vertical section of a barn-mow to which my improvement has been applied. Fig. 2 is a vertical section of a stack similarly treated. Fig. 3 is a plan view of a bay or mow. Fig. 4 is an end view of the horizontal ventilating-tube. Fig. 5 is a perspective view of the vertical tube and former.

Similar letters designate corresponding parts in all of the figures.

My improved method consists in the peculiar manner of producing ascending shafts or openings formed in the process of mowing, near the center or densest portion of the mow or stack, whereby the air may circulate freely and escape at the top, carrying off the dampness and moisture of the hay or grain, and preventing fermentation or "heating" from taking place.

As represented in the drawings, A indicates the side walls of the bay of a barn; B, the roof; C, a common ventilator thereon, and D D the hay or other material stored therein.

E E are the horizontal tubes, which may be formed of three strips of boards nailed together in the form of a trough, and laid with the open side upon the ground or floor of the bay. Their inner ends should either meet at the point where a central shaft is to ascend, or each should connect with such a shaft. The shaft is formed as follows: A square tube composed of boards put together in the form represented in Fig. 5, being eight or ten inches, or thereabout, in diameter, and five or six feet in length, is set upright in the bay in connection with the inner end of one or more of the tubes E, and the hay is packed around it as the mowing progresses. The mow is filled to the top of the tube and well packed around it, when it is drawn up a few feet and the filling of the mow continues. The box is thus drawn up by degrees as the filling of the mow progresses until it reaches the roof, when it is removed, and in this way an open shaft is left from the top to the bottom of the bay, into which the dry external air enters, as indicated by the arrows, and ascends to the roof, toward which it is constantly impelled by the rarefaction produced by the heat absorbed through the roof, so that a constant and active circulation is established. The effect of this is to take up and carry off the moisture of the hay and prevent it from receiving injury from fermentation, by which it becomes "heated," "musty," and "moldy," its nutritious properties being either destroyed or greatly impaired, and its use as food for cattle rendered injurious from its liability to engender disease. The porous structure of hay and grain enables evaporation to take place at a distance of several yards from the shaft, so that the influence of a single central shaft is sufficient for a small bay or a stack of common size. If the bay is large, however, it is well to form two or more shafts at suitable distances apart, so as to make the ventilation extend to all parts. It is advisable that the shaft should be situated near the part of the mow in which the person stands who pitches, as that becomes more closely packed, and is consequently more liable to injury. Care should be taken in raising the forming-tube not to raise the end above the compact part of the mow, so as the material might then become pressed in below it and obstruct the shaft. Free escape should be given to the foul air which ascends the shaft by an opening of some description through the roof. Its application to a stack is shown in Fig. 2. Here the tube G may be left at the top of the stack, partly projecting above its apex, to prevent rain, snow, &c., from driving in and effecting an injury to the stack. A protector, *h*, should be placed over the top of the tube to shed rain, leaving space beneath it for the escape of the ascending column of air. If the mow is elevated from the ground, the horizontal tubes may be dispensed with, and the shaft communicate directly with the space beneath it. This method not only preserves hay stored in the ordinary condition, but will keep that which is imperfectly cured, or cut and stored while green, if the system is properly employed. It thereby effects an important saving of time to the farmer, who may store his hay without waiting the usual time for drying, or who may put grain in his mow that has accidentally become damp, without injury to the other contents.

The nutritive properties of grass are much more fully preserved when it is stored before it is too ripe, or not too much dried by exposure to the sun, and the flavor is preserved so as to render it more inviting to cattle. Even green fodder may be safely cured in the barn by employing a sufficient number of ventilating-shafts to deprive it of superfluous moisture before fermentation takes place.

What I claim as my invention, and desire to secure by Letters Patent, is—

The method of forming ventilating-shafts in mows and stacks of hay or grain, by the employment of movable tubes or boxes G G, which are gradually raised through and retained in the same during the act of building up, substantially as herein set forth.

ABEL POST.

Witnesses:
   J. FRASER,
   J. C. CAMPBELL.